United States Patent [19]

Chiu

[11] Patent Number: 4,475,201

[45] Date of Patent: Oct. 2, 1984

[54] LONGITUDINALLY PUMPED DYE LASER ARRANGEMENT

[75] Inventor: Pay H. Chiu, London, Canada

[73] Assignee: Photochemical Research Associates Inc., London, Canada

[21] Appl. No.: 272,774

[22] Filed: Jun. 11, 1981

[51] Int. Cl.$^3$ ............................................... H01S 3/20
[52] U.S. Cl. ..................................... 372/53; 372/101; 372/92; 372/99; 350/290
[58] Field of Search ....................... 372/53, 54, 70, 99, 372/101, 98, 33, 51; 350/290

[56] References Cited

U.S. PATENT DOCUMENTS

| | | | |
|---|---|---|---|
| 3,725,810 | 4/1973 | Ashkin et al. | 372/53 |
| 3,731,110 | 5/1973 | Dewey, Jr. | 372/53 |
| 3,753,148 | 8/1973 | Billman | 372/53 |
| 3,771,065 | 11/1973 | Goldberg et al. | 372/53 |
| 3,868,590 | 2/1975 | Itzkan et al. | 372/53 |
| 3,868,592 | 2/1975 | Yarborough et al. | 372/53 |
| 3,913,033 | 10/1975 | Tuccio et al. | 372/34 |
| 4,298,845 | 11/1981 | Laude | 372/53 |

Primary Examiner—William L. Sikes
Assistant Examiner—Léon Scott, Jr.
Attorney, Agent, or Firm—Sim & McBurney

[57] ABSTRACT

A longitudinally pumped dye laser arrangement is disclosed. The arrangement comprises a unitary optical means, means for containing a lasing medium dye solution and means for reflecting lasing radiation towards the unitary optical means. The dye solution is located between the unitary optical means and the reflecting means. The reflecting means is proximate the dye solution. The unitary optical means is positioned relative to the containing means to focus a pumping beam into the dye solution and to collimate lasing radiation emerging from the containing means into an essentially parallel beam. This arrangement provides an economical and easily aligned longitudinally pumped dye laser.

14 Claims, 2 Drawing Figures

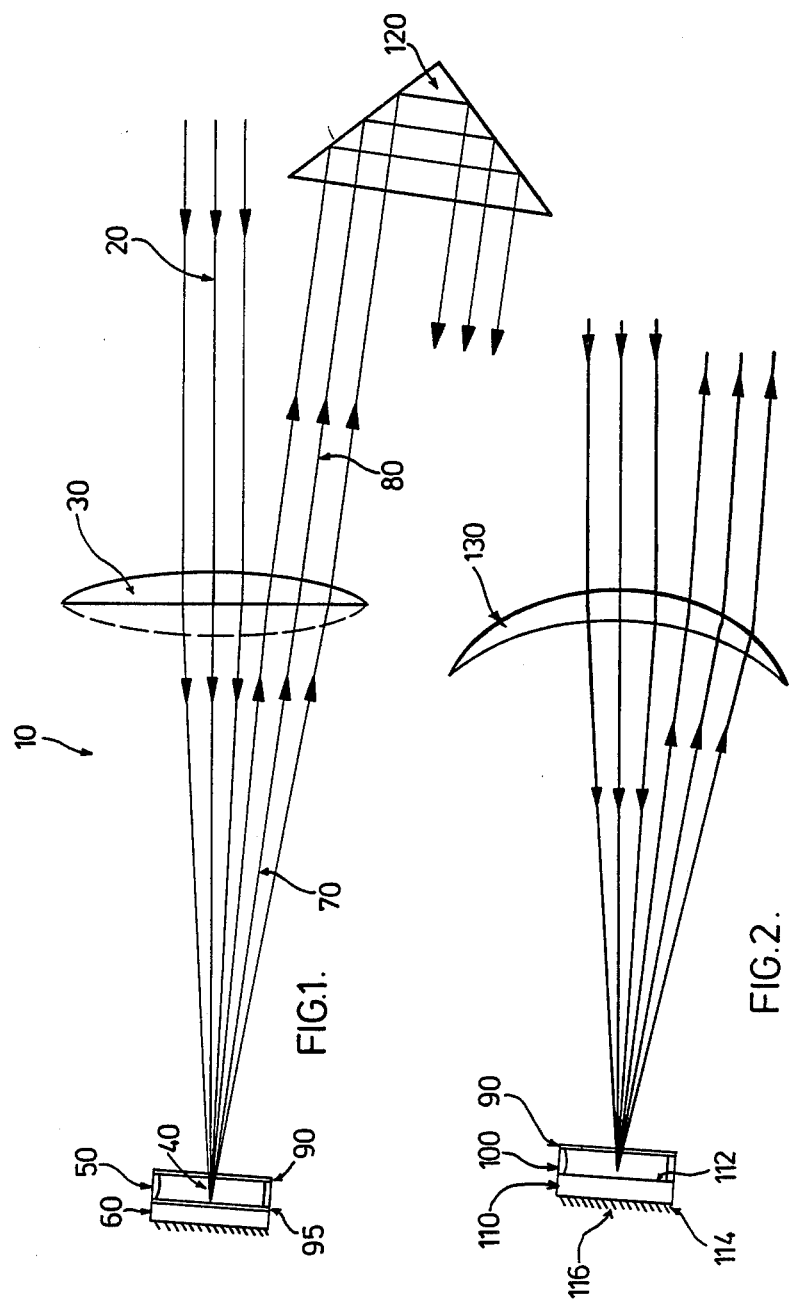

LONGITUDINALLY PUMPED DYE LASER ARRANGEMENT

FIELD OF THE INVENTION

This invention relates to dye lasers. More particularly, the invention relates to a longitudinally pumped dye laser arrangement.

BACKGROUND OF THE INVENTION

In the past, longitudinally pumped dye laser arrangements have been used, such lasers being different from transversely pumped dye lasers. One advantage of the longitudinally pumped dye laser arrangement compared to transversely pumped dye lasers is that an extremely small depth of dye solution may be used to produce short output pulses. All of these earlier longitudinally pumped units are either quite expensive or have a large number of optical components, which require critical alignment. In "Topics in Applied Physics", Volume 1, Dye Laser by F. P. Schafer (2nd edition), 1977, several longitudinally pumped dye laser arrangements are illustrated at page 39. In all of these arrangements, the output radiation emerging from the dye laser cell travels in the same direction and is essentially collinear with the input pumping beam. In order to create a resonator cavity and to suppress the input pumping beam in the output beam, it is necessary to coat the surfaces of the cavity with expensive dielectric, multilayer mirrors which selectively pass a desired radiation wavelength. The surface admitting the input pumping beam must be relatively transparent to light at the input pumping beam wavelength and the surface at the opposite and emerging end of the cavity should have a dielectric coating with a high reflectivity for the pumping beam wavelength. Conversely, at the lasing radiation wavelengths, the input surface admitting the pumping beam must have a high reflectivity and the surface from which the lasing radiation emerges must have a lower reflectivity so as to allow a portion of the dye lasing radiation to pass out of the optical resonator cavity.

A different longitudinally pumped dye laser arrangement is disclosed by H. Salzmann and H. Strohwald, Physics Letter, 57A (1976), 41. They show an arrangement consisting of a lasing medium dye solution contained between a mirror surface and a prism. The incoming pumping beam is reflected by a first mirror onto the prism's surface and refracted down into the dye solution where lasing activity takes place. The resulting lasing radiation travels through the prism, emerges from the prism at a different location than the pumping beam entered, is refracted out into free space and reflected by a second mirror into its desired direction. This placing of a prism in the optical path of a dye laser cavity has been used previously, as disclosed in the Yarborough et al, U.S. Pat. No. 3,873,941 at column 2, lines 24 through 36. Furthermore, the Salzmann et al arrangement requires that the first and second mirrors must be adjusted independently of one another for proper optical alignment.

G. Veith and A. J. Schmidt in Optics Communication, Volume 30, No. 3, September, 1979, disclose a transversely pumped dye laser arrangement where its output is amplified by a longitudinally pumped amplifier cell. The medium in the amplifier cell is excited to a level below the threshhold which is required for lasing action to occur. The dye laser pulse to be amplified enters the amplifier cell and causes stimulated emission to occur in the amplifier cell. This action results in the amplification of the dye laser pulse.

In the amplifier portion of their set up, a single lens was used to focus the exciting beam into the amplifier cell and to collect the amplified pulse emerging from the cell. A second lens was used to focus the dye laser pulse to be amplified into the opposite side of the amplifier cell than the beam to excite the dye solution enters from. Since the dye laser pulse to be amplified enters the amplifier cell from the opposite side of the cell than the amplified pulse emerges from, it is apparent that no mirror may be used to reflect the amplified pulse towards the first lens. Special care had to be taken to obtain a good spatial overlap between the focal region of the dye laser pulse to be amplified and the gain region. This is due to the fact that the dye laser pulse is entering the amplifier cell from the opposite side of the cell than the beam to excite the dye solution enters from. Also, since it is necessary for the length of the amplifier cell to be of sufficient magnitude so that a suitable amplification factor can be obtained, the alignment problems are further aggravated.

Although the prior art systems do function adequately, they are expensive, complicated, difficult to align and consist of many parts. The present invention seeks to mitigate these shortcomings.

SUMMARY OF THE INVENTION

The arrangement, according to this invention, provides an economical and easily aligned, longitudinally pumped dye laser. The apparatus for producing lasing radiation in a lasable dye solution is adapted for use with a laser which emits a pumping beam for the dye solution. The apparatus, according to an aspect of the invention, comprises a lasable medium dye solution and means for containing the dye solution. Means is positioned relative to the containing means for optically focusing a laser pumping beam into the dye solution when in use. Means is provided for reflecting lasing radiation generated in the solution when in use towards the optical means. The reflecting means is proximate the dye solution. The single optical means collimates the lasing radiation emerging from the containing means into an essentially parallel beam.

In one embodiment of the invention the containing means comprises a front and rear window with the dye solution contained between the windows and the reflecting means placed behind and adjacent the rear window. In another embodiment the containing means comprises a front window and a rear body portion adjacent said dye solution with the dye solution contained between the front window and the rear body portion. The rear body portion has a reflecting means for reflecting lasing radiation towards the unitary optical means.

BRIEF DESCRIPTION OF THE DRAWINGS

Preferred embodiments of the arrangement, according to the invention, are shown in the drawings wherein:

FIG. 1 is a schematic cross-sectional view of the longitudinally pumped dye laser arrangement; and FIG. 2 is a cross-sectional view of an alternate embodiment of the invention.

DETAILED DESCRIPTION OF THE EMBODIMENTS OF THE INVENTION

A cross-sectional view of the longitudinally pumped dye laser arrangement is shown generally as 10 in FIG. 1. An input pumping beam 20 is focused by a unitary optical member 30 into a region 40 which contains a lasing medium dye solution. The lasing medium dye solution is contained in a resonant cavity 50. The focused pumping beam 20 excites the lasing medium dye solution to an excited state or states which then drop back to their lower state or states resulting in a stimulated emission lasing action in the dye solution. A reflector 60 which is placed behind the lasing medium dye solution reflects the lasing radiation towards the unitary optical member 30. The lasing radiation emerging from the cavity containing the lasing medium dye solution is shown generally as 70 in FIG. 1. The same unitary optical member that focused the pumping beam also serves to collimate the lasing radiation emerging from the cavity containing the dye solution into an essentially parallel beam 80. The unitary optical member 30 is placed in a position relative to the cavity 50 containing the dye solution such that the pumping beam is focused into the lasing medium dye solution and the emerging lasing radiation 70 is collimated into an essentially parallel beam 80. This arrangement provides an easily aligned longitudinally pumped dye laser.

The cavity 50 for containing the lasing medium dye solution is of an inexpensive and simple construction. A front window 90 of the cavity allows the pumping beam to enter and excite the lasing medium dye solution contained in the cavity and allows lasing radiation to emerge from the cavity. In one embodiment of the invention a rear window 95 similar to the front window is provided.

The cavity may either be adapted to allow a replenishing flow of lasing medium dye solution to circulate essentially transversely to the direction of the pumping beam or the cavity may be sealed at both ends. At high pumping energies and high repetition rates or in a continuous mode, it may be necessary to provide for circulation of the lasing medium dye solution. It has been found satisfactory in most situations simply to have a stationary and non-replenished supply of lasing medium dye solution. In this instance the windows 90 and 95 are joined together along their sides and at least along their bottoms to form a cavity to contain the lasing medium dye solution. If a circulating flow is desired, it is apparent that the windows are only joined together along their sides and the top and bottom of the cavity are equipped with appropriate connections and plumbing to allow the solution to be replenished.

Micro-rectangular tubing of, for example, quartz or various grades of glass have proven most satisfactory to form the cavity 50 with its front window 90 and rear window 95. Such commercially available micro-rectangular tubing with the major surfaces of thickness of 0.2 mm acting as windows and an internal spacing between the windows of either 0.2 or 0.5 mm has proven satisfactory and economical in practice. Each of the major surfaces of the material comprising the micro-rectangular tubing has a reflectivity of approximately 4% at the pumping beam and the lasing radiation wavelengths.

It will be appreciated that a broad range of thicknesses of both the windows and the spacing between the windows may be used so long as the total thickness is sufficient to provide for a lasing action.

A reflector 60 is placed behind and proximate the lasing medium dye solution. The reflector 60 serves to reflect lasing radiation towards the unitary optical member 30. It is not necessary to have the reflector 60 adjacent the lasing medium dye solution, however, it is desirable that it be sufficiently close to the area of lasing activity so that it reflects the lasing radiation towards the unitary optical member in such a manner that it may be collimated into an essentially parallel beam.

In one embodiment of the invention the reflector 60 is placed behind and adjacent the rear window 95 of the cavity 50. In another embodiment, the rear surface of the rear window can be coated with either aluminum or silver to create a reflector. Also it it will be appreciated that the rear window 95 of the cavity 50 could be replaced with a rear body portion 110 having a reflecting surface for reflecting lasing radiation towards the unitary optical member 30. In FIG. 2 this alternate cavity 100 for containing the medium dye solution is illustrated. The front surface 112 of the rear body 110 may be provided with a reflecting surface for reflecting lasing radiation towards the unitary optical member. Alternatively, the rear surface 114 of the rear body portion 110 may be provided with a reflecting surface 116. It will be appreciated that in this case the rear body portion 110 should be substantially transparent at both the pumping and lasing wavelengths so that lasing radiation will be reflected by the reflecting surface 116 towards the unitary optical member. It is also possible to place the reflecting surface within the rear body portion 110, provided that at least that part of the rear body portion between the reflecting surface and the dye solution is substantially transparent at both the pumping and lasing wavelengths.

Many possible types of reflecting surfaces may be used so long as they act as good reflectors at the lasing radiation wavelength. A surface coated with either aluminum or silver has proven successful. Since the intense power of both the pumping beam and the lasing radiation tend to damage the reflector, it may be protected with an appropriate coating, such as, magnesium floride to reduce the damage. Also a dielectric mirror may be used.

There are many commercially available dyes which may be made into particular solutions chosen for a desired application, such solution being mainly governed by the desired lasing radiation wavelength. The concentration of the dye solution may be adjusted by diluting the dye in a suitable solvent. The desired concentration will be a function of the depth of the dye solution contained in the cavity. In practice it has been found advantageous to have the concentration of the dye solution adjusted so that only approximately 20% of the pumping beam radiation reaches the rear window or surface of the cavity.

The input pumping beam 20 is the output from another laser. The output from a nitrogen gas laser has been used and the output from either a longitudinally pumped or transversely pumped dye laser has also been used. The only requirements are that the pumping beam wavelength be compatible with the absorption characteristics of the lasing medium dye solution and that sufficient energy density from the pumping beam be produced in the lasing medium dye solution to result in a sufficiently large population inversion of the lasing medium dye solution to create a stimulated lasing activity. The pumping beam 20 is focused by the unitary optical member 30 to achieve a high pumping energy density in the lasing medium dye solution. A plano-convex lens is shown for the unitary optical member 30. However, a biconvex lens may be used as is illustrated by the dotted lines at 30 or a meniscus lens may be used as is illustrated in FIG. 2 at 130. As shown in FIG. 1, the pumping beam 20 enters the lens at its center. This is not strictly required but results in a less distorted focal point being cast into the lasing medium dye solution than if the pumping beam 20 entered the unitary optical member 30 at its periphery. The lens are preferably constructed of quartz since ordinary glass tends to attenuate the pumping beam and lasing radiation.

The lasing radiation is reflected by the reflector towards the unitary optical member 30. As shown in FIG. 1 the cavity 50 and reflector 60 are tilted slightly so that the emerging lasing radiation 70 from the cavity 50 is slightly non-collinear with the pumping beam 20. The emerging lasing radiation 70 is diverging and is collimated by the unitary optical member 30 into an essentially parallel beam 80. When the unitary optical member 30 is positioned so that the pumping beam 20 is focused into the lasing medium dye solution, it is apparent that the diverging lasing radiation emerging from the cavity will be collimated into an essentially parallel beam. It is advantageous to slightly tilt the cavity and the mirror so that the essentially parallel beam 80 is separated from the pumping beam 20. A prism 120 may then be placed to intercept the essentially parallel beam 80 and project it in any desired direction. It is apparent that a mirror may be used instead of the prism 120. It is also apparent that the cavity and mirror need not be tilted. If there is no tilting the emerging lasing radiation 70 will travel in a path collinear with the pumping beam. A dielectric mirror may be used to separate the essentially parallel beam from the pumping beam.

In the case of a non-tilted cavity and reflector it is apparent that the axis of the unitary optical member 30 is essentially normal to the front surface of the cavity 50. In the case of a tilted cavity and reflector as illustrated in FIG. 1, it is seen that the axis of the unitary optical member 30 is at an angle relative to an axis normal to the front window 90 of the cavity 50. Two considerations arise in choosing this angle. Because the unitary optical member is of a limited size, it follows that if the angle is too large, the lasing radiation emerging from the cavity would not be incident upon the optical member. Secondly, if the angle is too large, the pumping beam will not cause a lasing in the cavity, as is discussed in Yarborough et al, U.S. Pat. No. 3,873,941. An angle of approximately 6 degrees has proven satisfactory in practice and results in the essentially parallel beam 80 being separated from the pumping beam 20.

The spacing between the unitary optical member 30 and the cavity 50 is essentially equal to the focal length of the optical member. Two considerations arise in choosing the desired focal length of the optical member. Because a sufficiently high focused power density is required in the lasing medium dye solution, the focal length of the unitary optical member must not be too long since a long focal length has a larger focal spot size, resulting in a lower power density which may not be sufficient to cause lasing action in the cavity. Secondly, although most of the lasing radiation emerging from the cavity travels towards the unitary optical member 30, a certain amount of superradiant radiation emerges from the cavity in an approximately spherical-like fashion. This superradiant radiation results from the spontaneous emission of the highly excited dye solution and is undesirable and should not be collimated by the unitary optical member 30. If the unitary optical member is too close to the cavity 50 an undesirably large amount of this superradiant lasing radiation will be collimated. Therefore it is desirable to ensure that the focal length of the unitary optical member 30 is of sufficient length so that an insignificant amount of super radiant radiaton is collimated. Also, if too short a focal length is used, too high a power density is provided in the cavity 50 to produce a high percentage of undesirable superradiant pulses might occur.

To set up this longitudinally pumped dye laser arrangement no critical alignment steps are necessary. The pumping beam 20 is aligned so that it falls on the surface of the unitary optical member 30. The spacing between the unitary optical member 30 and the cavity 50 is adjusted visually so that a well defined focal region exists in the lasing medium dye solution. The cavity 50 and the mirror 60 may be slightly tilted so as to separate the pumping beam 20 and the resulting essentially parallel beam 80.

Having generally described this invention, a specific example which is not intended to be limiting will be given. A cavity made from micro-rectangular in cross-section tubing of glass or quartz with front and rear windows of 0.2 mm thickness and an internal spacing of 0.5 mm was used. Rhodamine 6G lasing medium dye solution (approximately $8 \times 10^{-3}M$ in ethanol) was pumped by a nitrogen gas laser of approximately 200 kilowats for approximately 300 picoseconds at a repetition rate of 20 pulses per second. A quartz plano-convex lens with a focal length of 2 inches was used. Output lasing radiation resulted which had a duration not exceeding 75 picoseconds.

Although preferred embodiments of the invention have been described herein in detail, it will be understood by those skilled in the art that variations may be made thereto without departing from the spirit or the invention or the scope of the appended claims.

The embodiments of the invention in which an exlcusive property or privilege is claimed are defined as follows:

1. Apparatus for producing lasing radiation in a resonant cavity defined in a contained lasable dye solution for use with a laser which emits a pumping beam to pump said dye solution, said apparatus comprising said dye solution, means for containing said dye solution, said containing means having a front window with a single optical means being positioned in front of said front window between said laser and said containing means for optically focusing said laser pumping beam through said front window into said dye solution, means for reflecting lasing radiation generated by said pumping beam in said dye solution through said front window towards said single optical means, said resonant cavity being defined between said reflecting means and said front window where said reflecting means is proximate said dye solution and positioned adjacent the rear of said resonant cavity, said lasing radiation generated in said dye solution by said pumping beam emerging from said containing means and passing through said single optical means to be collimated into an essentially parallel beam and means for separating said pumping beam which passes through said single optical means and into said containing means from said lasing radiation emerging from said containing means and which has been collimated by said single optical means whereby said separated collimated lasing radiation is separated from said incoming pumping beam.

2. The arrangement of claim 1, wherein said containing means comprises a rear window opposite said front window with said dye solution contained between said front window and rear window, said reflecting means comprising a reflecting surface placed behind and adjacent said rear window for reflecting lasing radiation towards said single optical means.

3. The arrangement of claim 2, wherein said containing means comprises a rectangular cross-section container of glass or quartz, the wall thickness of said front and rear windows being in the range of 0.2 mm.

4. The arrangement of claim 2 or 3, wherein the distance between the front surface of said front window and the rear surface of said rear window is in the range from 5 mm down to a thickness which continues to provide a lasing action in said dye solution.

5. The arrangement of claim 2, with reflecting means being provided on the front surface adjacent said dye solution of said rear window.

6. The arrangement of claim 2 or 5, wherein said single optical means comprises a plano-convex, biconvex or meniscus lens.

7. The arrangement of claim 6, wherein the axis of said lens is essentially normal to the front surface of said containing means, the lens having a predetermined focal length where the spacing between said lens and said containing means is essentially equal to the focal length of said lens.

8. The arrangement of claim 6, wherein said means for separating said collimated lasing radiation from said pumping beam includes tilting the axis of said lens is at an angle relative to an axis normal to the front surface of said containing means, said angle being such that lasing radiation emerging from said containing means continues to be collimated into an essentially parallel beam by said single optical means, the spacing between said lens and said containing means being essentially equal to the focal length of said lens.

9. The arrangement of claim 6, wherein said single optical means is quartz.

10. The arrangement of claim 2 or 5, wherein said reflecting surface is an aluminum or silver coating.

11. The arrangement of claim 10, wherein said reflecting surface is protected with a protective coating of magnesium floride.

12. The arrangement of claim 2 or 5 wherein said reflecting surface is formed by an appropriate dielectric coating.

13. The arrangement of claim 2 or 5 wherein the reflectivity of said windows is less than 10% at both the pumping beam and lasing radiation wavelengths.

14. The arrangement of claim 5 wherein the distance between the front surface of said front window and said rear window is in the range from 5 mm down to a thickness which continues to provide a lasing action in said dye solution.

* * * * *